United States Patent [19]

Itoh

[11] Patent Number: 5,285,247
[45] Date of Patent: Feb. 8, 1994

[54] LINEAR PRINT HEAD IMAGE FORMING APPARATUS WITH MAGNIFICATION ADJUSTMENT

[75] Inventor: Tetsuya Itoh, Osaka, Japan

[73] Assignee: Minolta Camera Kabushiki Kaisha, Japan

[21] Appl. No.: 950,748

[22] Filed: Sep. 24, 1992

Related U.S. Application Data

[63] Continuation of Ser. No. 434,918, Nov. 9, 1989, abandoned.

[30] Foreign Application Priority Data

Nov. 9, 1988 [JP] Japan .................. 63-283491
Oct. 5, 1989 [JP] Japan .................. 1-261787

[51] Int. Cl.⁵ ............... G03G 15/00; G03G 15/20; G03G 21/00
[52] U.S. Cl. ................... 355/282; 346/160; 355/200; 355/311
[58] Field of Search ........... 355/200, 210, 218, 228, 355/244, 311, 282; 358/300, 474, 475; 346/160, 160.1

[56] References Cited

U.S. PATENT DOCUMENTS

| | | | |
|---|---|---|---|
| 4,435,064 | 3/1984 | Tsukada et al. | 355/1 |
| 4,478,504 | 10/1984 | Tanaka | 355/69 X |
| 4,596,995 | 6/1986 | Yamakawa et al. | 346/160 |
| 4,755,855 | 7/1988 | Watanabe | 355/317 |
| 4,782,371 | 11/1988 | Yokota | 355/55 X |
| 4,789,879 | 12/1988 | Murakami | 355/244 |
| 4,792,828 | 12/1988 | Ozawa et al. | 355/317 |
| 4,831,395 | 5/1989 | Pham et al. | 346/160 |
| 4,835,549 | 5/1989 | Samejima et al. | 346/160 X |

FOREIGN PATENT DOCUMENTS

| | | |
|---|---|---|
| 57-122455 | 7/1982 | Japan . |
| 62-36677 | 2/1987 | Japan . |
| 62-177567 | 8/1987 | Japan . |
| 62-267768 | 11/1987 | Japan . |
| 62-288868 | 12/1987 | Japan . |
| 63-5366 | 1/1988 | Japan . |
| 63-5367 | 1/1988 | Japan . |
| 63-5368 | 1/1988 | Japan . |
| 63-116174 | 5/1988 | Japan . |

Primary Examiner—Fred L. Braun
Attorney, Agent, or Firm—Price, Gess & Ubell

[57] ABSTRACT

In an image forming apparatus, when images are formed on a sheet on and after a second round of an image forming operation, an image forming pitch by a print head which linearly forms the images in the direction perpendicular to the image forming line is controlled so as to vary from the preceding pitch corresponding to the rate of expansion and contraction of the sheet in the preceding image forming operation. When images are formed on a sheet on and after the second round of the image forming operation, the length of the image to be formed is controlled for expansion and contraction corresponding to the actual rate of expansion and contraction automatically detected by a size detecting sensor in the preceding image forming operation.

14 Claims, 10 Drawing Sheets

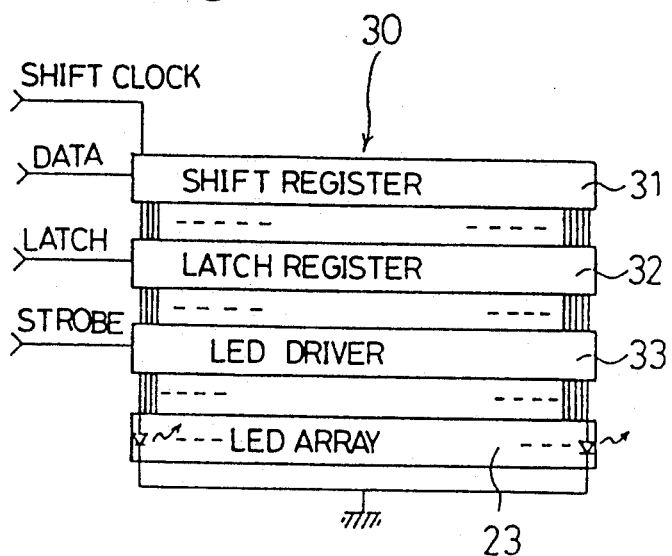
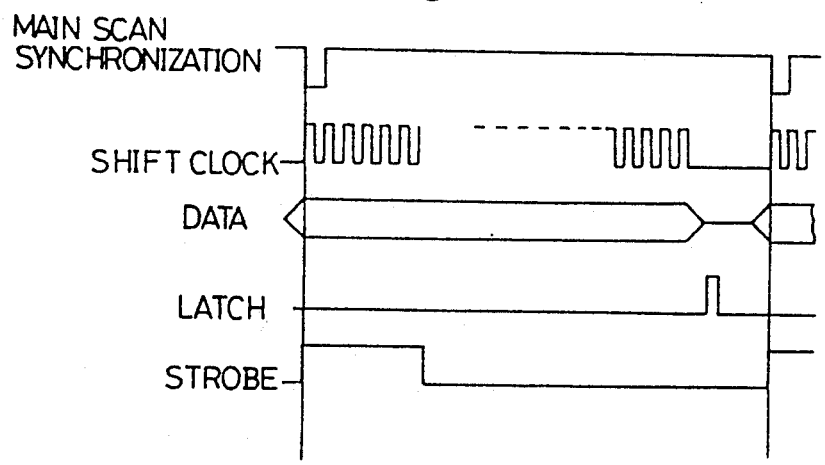

LINEAR PRINT HEAD IMAGE FORMING APPARATUS WITH MAGNIFICATION ADJUSTMENT

This is a continuation of application Ser. No. 434,918, filed on Nov. 9, 1989, now abandoned for an IMAGE FORMING APPARATUS.

BACKGROUND OF THE INVENTION

1. Technical Field of the Invention

The present invention relates to an image forming apparatus, and more particularly to a light printer which is capable of forming images in a composite mode wherein images are formed by overlaying images on the same surface of a sheet and in a double-sided mode wherein images are formed on both sides of the same sheet.

2. Description of Related Art

In an image forming apparatus such as a printer, copying machine, and the like, electrophotographic image forming apparatus has heretofore been well known for forming images wherein an electrostatic latent image is first formed by exposing a photoconductor with an image and then the electrostatic latent image is developed by toner to transfer the image onto a copy sheet. As an exposure medium, it is well known that a laser and LED elements can be controlled for an exposure process based on the image data produced from an original by reading the original image or with the use of a personal computer, word processor or the like, besides an optical system exposure assembly in which the reflection of an original image is irradiated by using the optical system comprised of lenses and reflectors. In a laser exposure process, a rotary scanning system has been put into practical use as an exposure system in which a modulated laser beam is deflected by a rotating polygon mirror for a scanning operation, and in an LED exposure process, a fixed scanning system has been used as an exposure system wherein an LED array is provided with a multiplicity of LED elements closely arranged with a selective turning on of each LED.

On the other hand, as image forming modes, there are provided a composite mode for forming images on one side of a sheet overlaying images and a double-sided mode for forming images on both sides of a sheet, in addition to ordinary mode in which a single image is formed on one side of a sheet. For such composite and double-sided modes, an apparatus is well known which is arranged for repeatedly carrying out an image transfer and fixing process more than twice on the same sheet. However, in such composite and double-sided modes wherein a transfer and fixing process are repeatedly performed a plurality of times on the same sheet as described above, the sheet is liable to expand or contract since the sheet is heated or pressed by a first round of a fixing process, and when an image is transferred and fixed with the same magnification at a second round of a fixing process, there arises slippage between images especially in a composite image forming process, and a proper image cannot be obtained.

For instance, Published Unexamined Japanese Patent Application No. 177567/1987 discloses an image forming apparatus which is capable of solving the above problem, wherein the contraction of a sheet which arises under the composite and double-sided modes is rectified by delaying the sheet transport speed at the time when a second image is formed.

In U.S. Pat. No. 4,789,879, there is disclosed an alternative solution to the problem. In a copying machine adapted to project and expose an original image onto a photoconductor, it is arranged to correspond with the expansion or contraction of the sheet by scanning an original image with scanning means which is comprised of lenses and mirrors when a copying operation is carried out under a composite or double-sided mode wherein the copying magnification is varied according to the change is speed of scanning and the movement of the lenses. These methods may be applied only to a copying machine which is adapted to scan an original image with scanning means as described above, however, they cannot be applied to an ordinary light printer.

In each of the prior arts described, the slippage of composite images is rectified by predetermining the amount of contraction of the sheet when the images are formed thereon. However, the rate of expansion and contraction of a copy sheet caused by the fixing process is varied according to the fixing condition of the image forming apparatus, the kind and area of the sheet, the textured direction of fabric, and the percentage of water content of the sheet, ambient temperature, humidity and the like. Especially, the percentage of water content, ambient temperature and humidity which largely vary by themselves are factors that will largely vary expansion and contraction of the sheet, and it is very difficult to settle these conditions in view of the maintenance and daily handling of the sheet. Accordingly, when the expansion and contraction of an image is controlled to a high accuracy corresponding to the expansion and contraction of the copy sheet, it will become more difficult to correspond with the actual rate of expansion and contraction of the sheet.

SUMMARY OF THE INVENTION

A primary object of the present invention is to provide an image forming apparatus which is capable of preventing slippage of images which arises when a plurality of images are repeatedly formed on the same sheet by forming images at a rate of expansion and contraction accurately corresponding to the expansion and contraction of the sheet at the time when the transfer and fixing processes are conducted on and after a second round of said process when the transfer and fixing process are repeatedly performed a plural number of times on the same sheet.

Another object of the present invention is to provide an image forming apparatus which can be applied to an ordinary light printer for forming images accurately corresponding to the expansion and contraction of the sheet on and after a second round of transfer and fixing processes wherein said printer is not provided with a scan optical system for scanning and exposing the original image.

A further object of the present invention is to provide an image forming apparatus which is capable of forming images with a proper expansion and contraction corresponding to an actual rate of expansion and contraction of the sheet on and after a second round of transfer and fixing processes.

A still further object of the present invention is to provide an image forming apparatus which is capable of accomplishing the expansion and contraction in the image forming process with a high accuracy on and after a second round of transfer and fixing processes.

These and other objects and features of the present invention will become more apparent from the following description taken in conjunction with the accompanying drawings which illustrate specific embodiments of the invention.

BRIEF DESCRIPTION OF THE DRAWINGS

FIG. 3 is a constructional view of the LED exposure unit.

FIG. 4 is a timing chart of the operation of the LED exposure unit.

It is to be noted that like parts are designated by like reference numerals and marks throughout each embodiment of the present invention and a repeated description is omitted.

DESCRIPTION OF THE PREFERRED EMBODIMENTS

Figure 1:
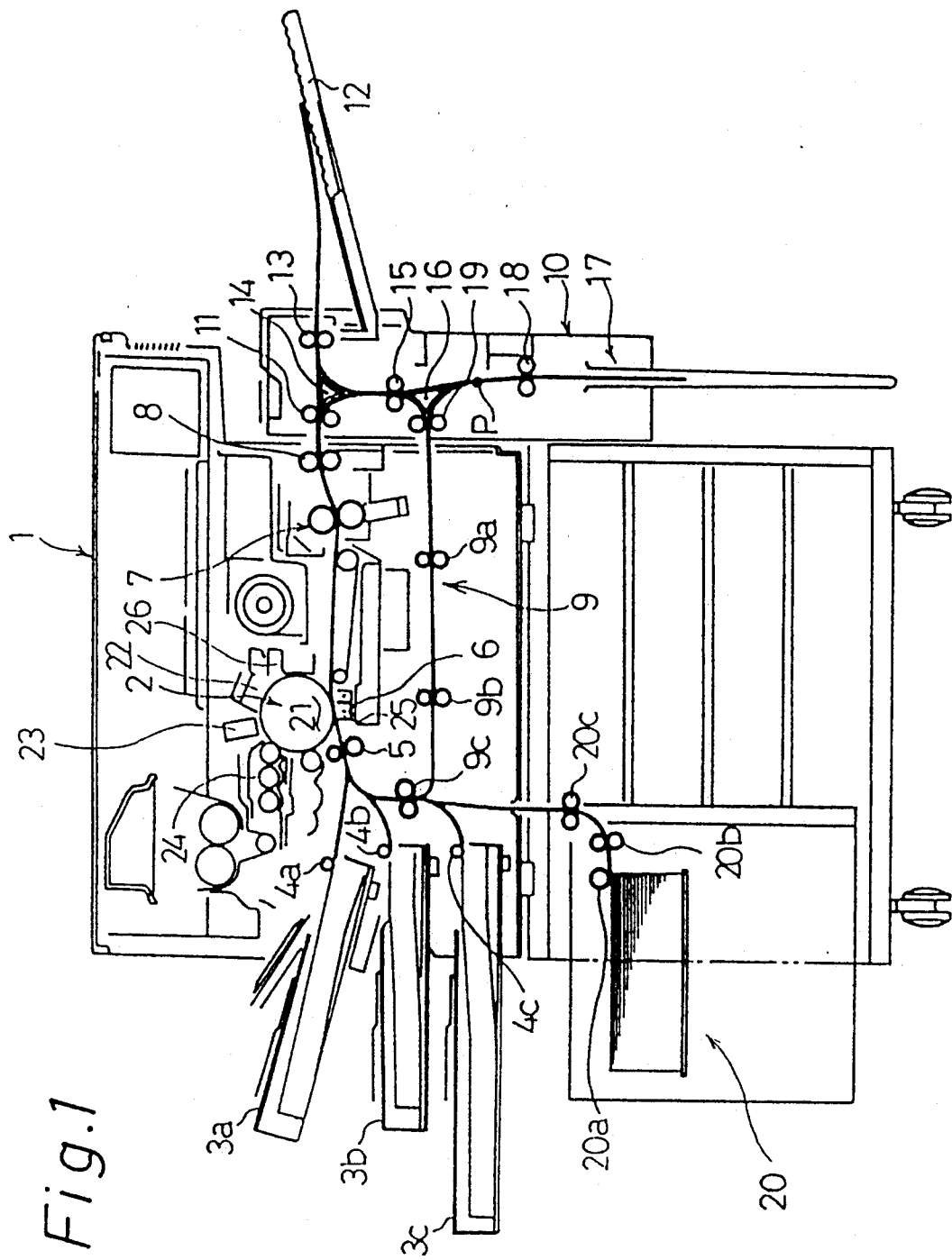
FIG. 1 is a schematic constructional view showing a printer which is provided with an LED array as an exposure means to which the present invention is applied as a first embodiment.

Embodiments of the present invention will now be described below with reference to the accompanying drawings.

FIGS. 1 through 7 show a first embodiment of the present invention which is applied to a printer having an LED exposure unit. As briefly illustrated in FIG. 1, at about the central part of the main body 1 of a printer, there is provided a well-known electrophotographic image forming section 2 comprising a photoconductive drum 21, a charger 22, an LED array 23, a developing unit 24, a transfer charger 25, a drum cleaner 26 and the like.

On one side of the main body 1, paper feed cassettes 3a, 3b and 3c are mounted, and a sheet is fed from a selected paper feed cassette by one of the paper feed rollers 4a, 4b, 4c which corresponds to the paper feed cassette selected toward a transfer section 6 between the photoconductive drum 21 through a register roller 5 and the transfer charger 25 in the image forming section 2. The sheet of paper on which an image is transferred at the transfer section 6 is fixed at a fixing section 7. A paper re-feed path 9 provided with transport rollers 9a, 9b and 9c is arranged for re-feeding the sheet which is sent by a discharge roller 8 to a duplex unit 10 toward the register roller 5.

In the duplex unit 10, a first change-over claw 14 is provided at a position between a taking-in roller 11 which is arranged for receiving a sheet discharged from the main body 1 and a discharge roller 13 which is arranged for discharging the sheet onto a discharge tray 12 by the first change-over claw 14, and there is arranged a mechanism so as to select either to send out a sheet toward the discharge tray 12 or to send out the sheet toward a second change-over claw 16 through a transport roller 15 which is rotatable regularly and in reverse.

The second change-over claw 16 is arranged to send a sheet into a switchback section 17 or to send out the sheet to the paper re-feeding path 9 through a sending out roller 19 or reverse to send out the sheet at the switchback section 17 toward the paper re-feeding path 9, or to send out the sheet toward the discharge tray 12 through the transport roller 15 and the first change-over claw 14. In the switchback section 17, there is arranged a transport roller 18 which is rotatable regularly and reverse. In the main body 1, there is also provided an optional paper feed section 20 which includes a paper feed roller 20a and transport rollers 20b and 20c.

Basic printing action under double-sided and composite modes will now be described below.

In the case when an image is formed under the double-sided mode, for instance, a sheet fed by the paper feed roller 4a from the upper paper feed cassette 3a in the main body 1 is adjusted so as to make its leading end coincide with the leading end of an image on the photoconductive member 21 by the register roller 5, and is sent to the transfer section 6 to have the image formed in the image forming section 2 transferred thereon, and is further sent to the fixing section 7 for a fixing process, and thereafter, the sheet is sent into the duplex unit 10 by the discharge roller 8. The sheet passed through the transport roller 11 is transported to the switchback section 17 by the first change-over claw 14 through the transport roller 15. The transport roller 18 then starts rotating reverse to send the sheet toward the sending-out roller 19 by the second change-over claw 16, and the sheet is sent out onto the paper re-feed path 9 in the main body 1. The sheet again reaches the register roller 5 after passing through the paper re-feed path 9, and in the transfer section, the timing is adjusted in the same manner as described above to have a second image formed in the image forming section 2 to be transferred onto the reverse side of the sheet, and is further sent to the fixing section 7 for the fixing process. Thereat the sheet is discharged onto the discharge tray 12 passing through the discharge roller 8, the transport roller 11, the first change-over claw 14 and the discharge roller 13.

In the case where an image is formed under the composite mode, an image formed in the image forming section 2 is transferred onto the front surface of a sheet in the transfer section 6 and is fixed in the fixing section 7. Then, the sheet is sent into the duplex unit 10 from the discharge roller 8, and is transported onto the paper re-feed path 9 after passing through the taking-in roller 11, the first change-over claw 14, the transport roller 15, the second change-over claw 16 and the sending-out roller 19. The sheet is again forwarded into the transfer section 6 through the register roller 5, and a second image formed in the image, forming section 2, is transferred onto the surface of the sheet for providing overlaying images on the image previously transferred and is further fixed at the fixing section 7. Thereafter, the sheet is discharged onto the discharge tray 12 passing through the duplex unit 10.

FIG. 3 shows the structure of an exposure unit 30 comprising the LED array 23 and its driving control circuit. In the FIG. 3, numeral 31 represents a shift register into which image data is successively inputted based on a shift clock, a latch register 32 for latching image data of the shift register 31 based on a latch signal, an LED driver 33 for driving each LED in the LED array 23 by outputting an output corresponding to the data latched in the latch register 32 based on a strobe signal.

In the following description, a main scanning direction means the direction in which a print head of the LED exposure unit 30 and the like linearly scans and exposes the surface of photoconductor, while a secondary scanning direction means the direction of movement of the surface of the photoconductor for receiving the main scanning with constant pitch. In case of this embodiment, the secondary scanning direction is a direction of rotation of the photoconductive drum 21, and the main scanning direction is the direction of an axis of the photoconductive drum 21, and they are in a relationship perpendicular to each other.

As illustrated in FIG. 4, in the LED exposure unit 30, image data for one line is inputted into the shift register 31 synchronously with the shift clock. The shift clock starts to be outputted in response to the main scan synchronous signal as a start signal. After the image data for one line is inputted, a latch signal is outputted to latch the image data in the latch register 32. Thereafter, a strobe signal is outputted in response to the next main scan synchronous signal, and the LED is turned on based on the image data latched in the latch register 32 to expose the photoconductive drum 21.

Figure 5:
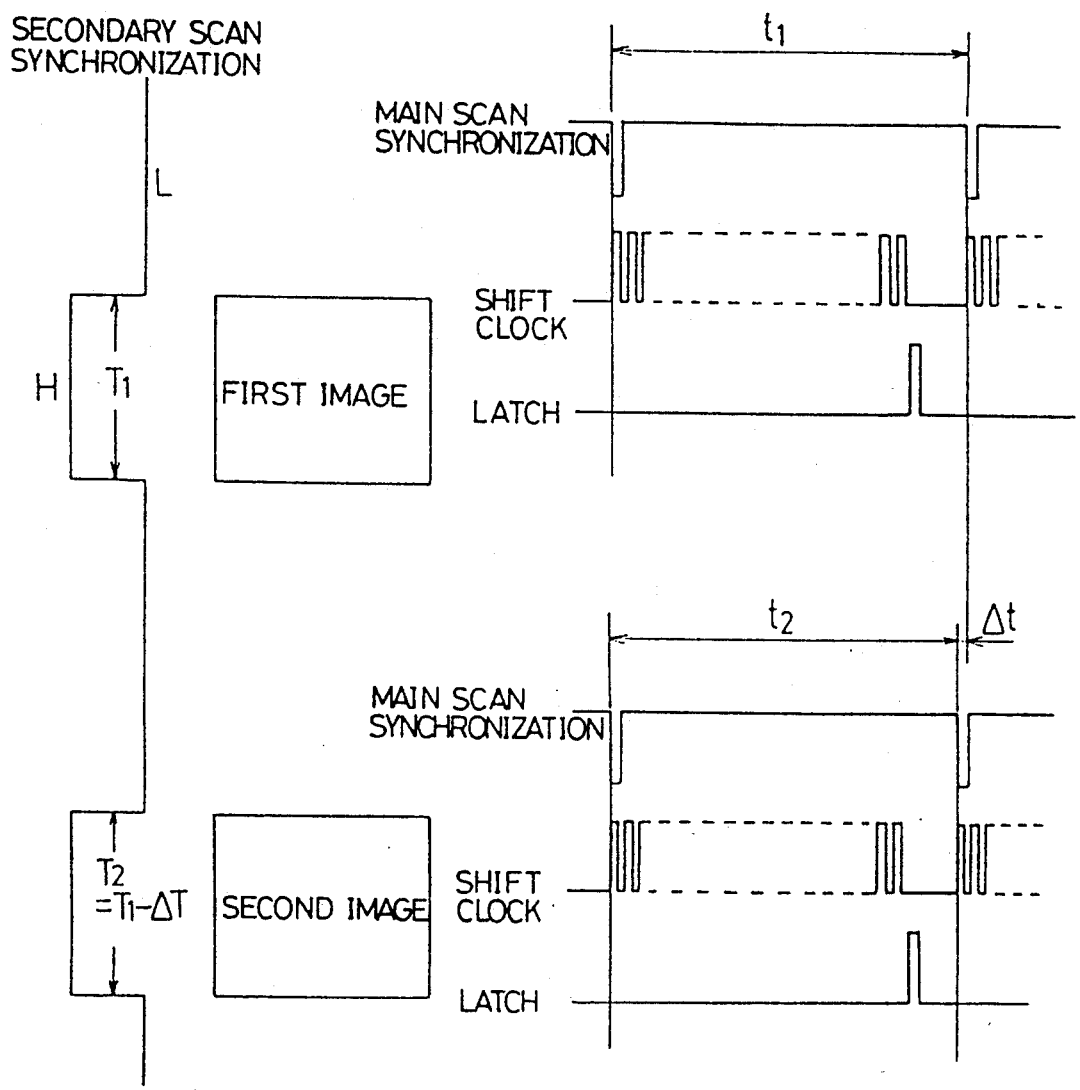
FIG. 5 is an explanatory drawing of a cyclic rectifying action of a main scan synchronous signal.

Action of the LED exposure unit 30 under composite and double-sided modes wherein first and second images are formed on the same sheet will now be described referring to FIG. 5.

First, the secondary scan synchronous signal is activated from a low to a high level at an exposure start timing for a first image, and the main scan synchronous signal is outputted at a predetermined cycle $t_1$. A shift clock for one line starts to be emitted in response to the main scan synchronous signal, and after an image data for one line is inputted in the shift register 31, the latch signal is emitted to latch the image data in the latch register 32. At an adequate time after the latch signal has been emitted, and when a next main scan synchronous signal is emitted, the action as described above is repeated and each LED is turned on corresponding to image data latched by the strobe signal. The action is repeatedly performed for the number of lines predetermined for one image forming operation, and the secondary scan synchronous signal returns to a low level after $T_1$ time has passed since the signal got to a high level.

With exposure start timing for a second image, the secondary scan synchronous signal is again activated to a high level and the main scan synchronous signal is outputted at a cycle $t_2 = (t_1 - \Delta t)$. An image data is then inputted into the shift register in the same manner as described above and the LED is controlled to turn on. The action is repeatedly performed for the number of lines predetermined for one image forming operation, and the secondary scan synchronous signal returns to a low level after $T_2 = (T_1 - \Delta T)$ has passed. By so doing, the cycle of the main scan synchronous signal is shortened by $\Delta t$ when a second image is formed, and consequently, the time in the high level of the secondary scan synchronous signal is shortened by $\Delta T$. As a result, the image length of the second image in the secondary scanning direction is shortened as compared with that of the first image, since the circumferential speed of the photoconductive drum 21 is constant. By applying the shortened amount to the contraction of the sheet caused by a fixing process at the first image forming process, the slippage of images can be avoided under the composite and double-sided modes of operation.

Figure 2:
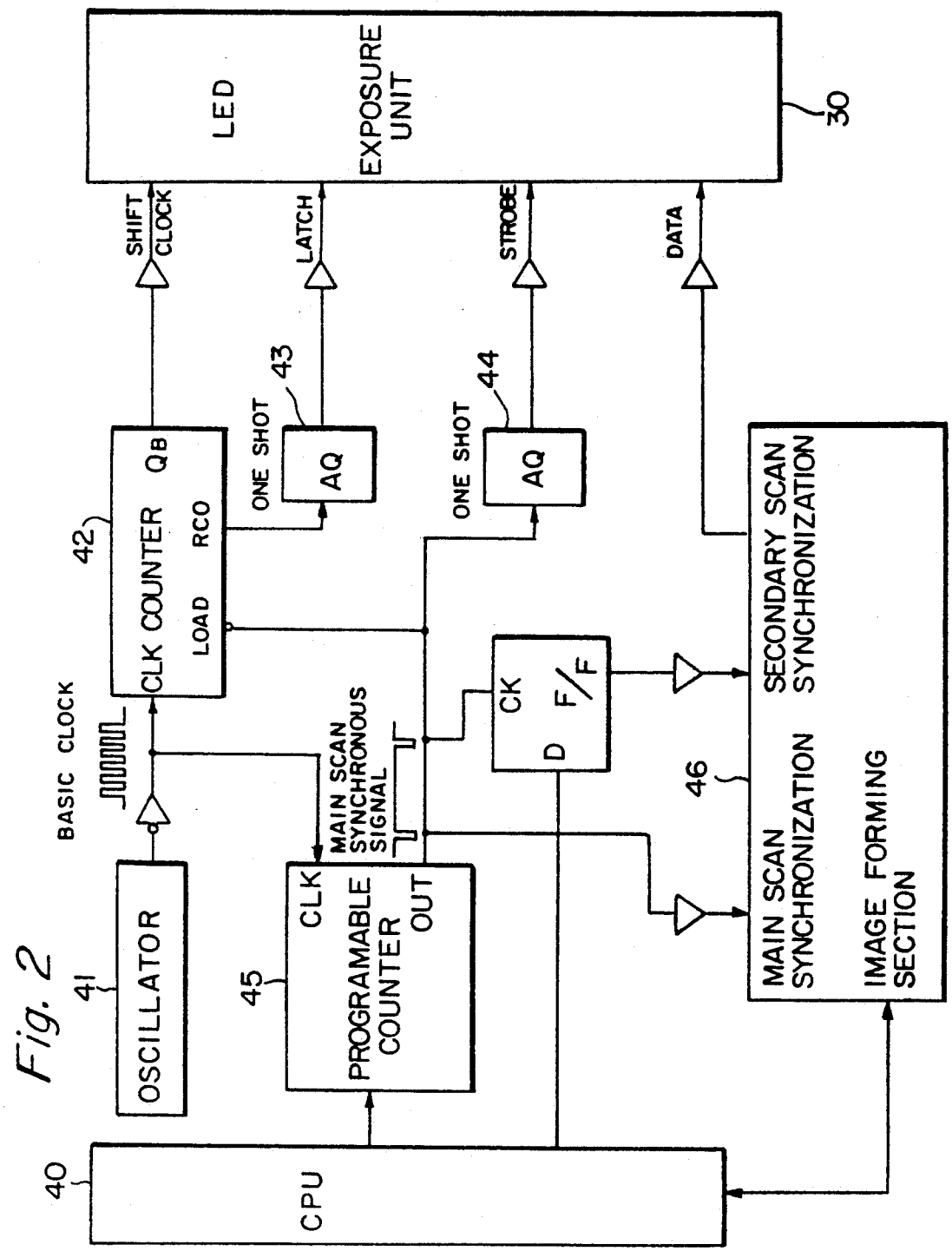
FIG. 2 is a control circuit diagram of an LED exposure unit.

A circuit construction for carrying out the above-described operational control will now be described with reference to FIG. 2.

The CPU 40 controls the whole main body 1 of the printer and the LED exposure unit 30, and signals are given and received between the CPU 40 and an image forming section 46. The image forming section 46 performs processing of an image data to the bit map in accordance with instruction from the CPU 40, and on receipt of instruction for a printing action, the image data is successively outputted to the LED exposure unit 30 according to the main and secondary scan synchronous signals.

A predetermined number of shift clocks which are outputted from the counter 42 by receiving a basic clock from an oscillator 41 are inputted into the LED exposure unit 30, and the latch signal and the strobe signal are inputted into a predetermined width of pulses which are outputted from monostable multivibrators 43, 44.

In addition to the counter 42, there is also provided a programmable counter 45 which outputs the main scan synchronous signal to the image forming section 46 by receiving a control signal from the CPU 40 and a basic clock from the oscillator 41.

When a printing is made under either the composite or double-sided mode, the programmable counter 45 is controlled by a control signal emitted from the CPU 40, and a cycle of the main scan synchronous signal is shortened at the time of a second image forming operation so as to shorten the image length in the secondary scanning direction corresponding to the contraction of the sheet caused by a fixing process in the first round of the image forming process. The value set for the cycle of the main scan synchronous signal in the CPU 40 for on and after a second round of image the forming operation is arranged to be optionally adjusted by using an adjust switch (not illustrated) or the like provided on the side of the main body 1 of the printer at the time of maintenance work or some other occasion.

Control process by the CPU 40 will now be described below.

Figure 6:
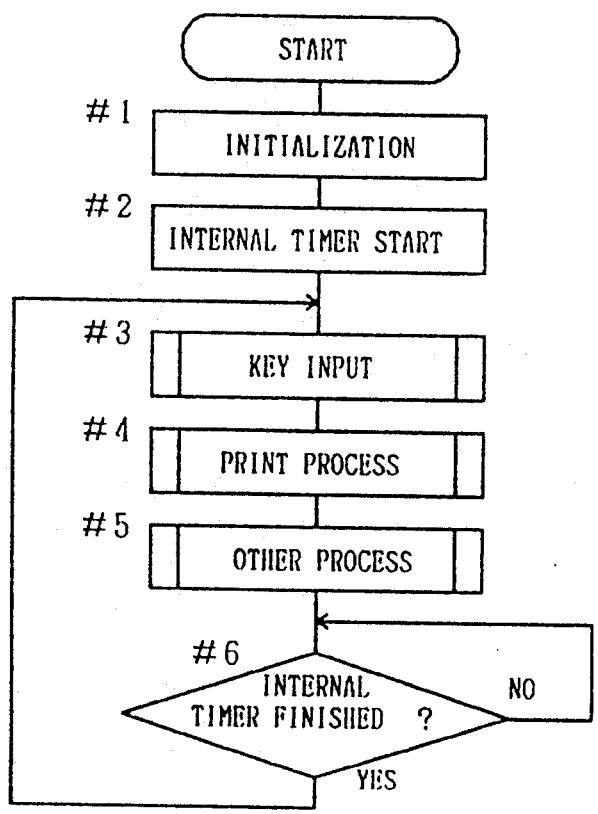
FIG. 6 is a main flow chart of control.

FIG. 6 shows the flow chart of a main routine of the CPU 40. When the power source of main body 1 of the printer is turned on and the CPU 40 is reset, a program is started. At step #1, an initialization is made for cleaning the random access memory, initializing each register, and setting each device at a predetermined mode. Then, at step #2, an internal timer is started. The internal timer regulates the time required for the main routine, which becomes a standard for the time which will be used for each subroutine, and the value is previously set at step #1. At step #3, the key input subroutine, at step #4 the print process subroutine, and at step #5 the sheet jam and other process subroutines are successively called. Thereafter, the program returns to step #2 when the internal timer is finished at step #6.

Figure 7:
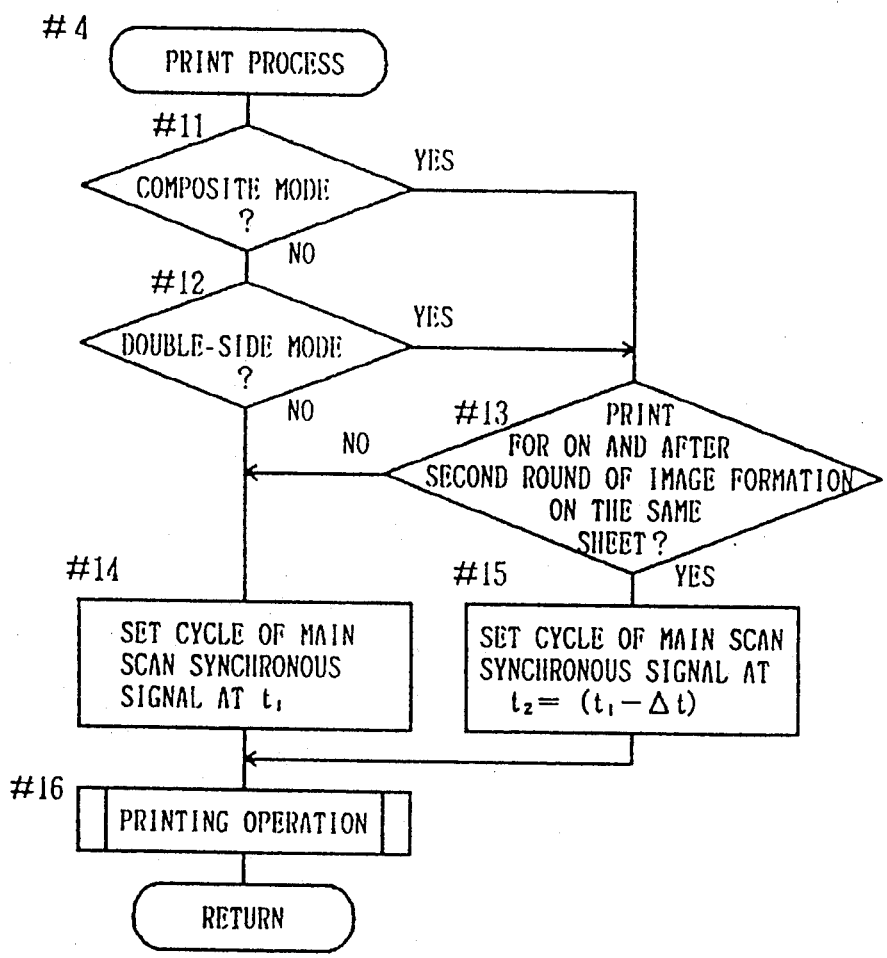
FIG. 7 is a flow chart of a subroutine of printing process.

FIG. 7 shows a subroutine of the printing process at step #4. At step #11, judgment is made whether the printing mode is composite or not, and if it is a composite mode, the program proceeds to step #13. If it is not a composite mode, judgment is made whether the print mode is a double-sided mode or not at step #12, and if it is a double-sided mode, the program proceeds to step #13. If it is neither a composite mode nor a double-sided mode, the program proceeds to step #14.

At step #13, judgment is made whether a print is to be made on and after the second round of printing on the same sheet, and if it is the first round of printing, the program proceeds to step #14. If the printing is for on and after the second round of the printing process, the program proceeds to step #15.

At step #14, the cycle of the main scan synchronous signal is set at $t_1$, and at step #15, it is set at $t_2=(t_1-\Delta t)$, wherein corresponding control signal is outputted to the programmable counter 45, and the program proceeds to step #16. At step #16, the main scan synchronous signal and the secondary scan synchronous signal are outputted in synchronization with the actions of each device in the image forming section 2 and the paper feed system, while the subroutine of printing action for printing is executed and the program returns to main routine.

To summarize the above-described embodiment, the slippage of image can be avoided by expanding or contracting the length of image in the secondary scanning direction when the image forming operation is carried out on and after the second round of image forming operation wherein the scanning interval in the secondary scanning direction is changed corresponding to the expansion and contraction of a sheet caused by the fixing process in the previous image forming process.

By controlling to change the cycle of the main scan synchronous signal relative to the print head, the length of image in the secondary scanning direction can be rectified with high accuracy corresponding to the expansion and contraction of the copy sheet since it can be controlled fully without receiving any factor of mechanical influence. It is also suitable for use in an exposure system for exposing the surface of the moving photoconductive drum 21 in the direction perpendicular to its moving direction based on an image data which is the same as the LED exposure unit 30 described above. The exposure system includes a liquid crystal shutter array and a PLZT array, to which the present invention may also be applied.

Even if a laser printer in which the surface of the photoconductor is scanned by a modulated laser beam corresponding to an image data through a rotating polygon mirror or a galvano mirror which is rotated back and forth in an arc and an image is linearly exposed, it may also be possible to perform the same effect as the present invention, although some mechanical adjustment is required since a scanning interval in the secondary scanning direction can be varied by varying the modulation of the clock signal for emitting a laser head at a predetermined timing and by varying the number of rotations of the polygon mirror and the swinging speed of the galvano mirror.

The expansion and contraction of a sheet caused by the fixing process is varied by environmental conditions such as quality and area of sheet, textured direction of fiber, percentage of water content and ambient temperature and humidity. However, in an environment where such conditions do not vary much, a fixed value may previously be set without inviting a problem in practical use. For instance, if it is arranged to make an adjustment at the time of maintenance or some other occasion, it may be arranged to rectify the cycle of the main scan synchronous signal so as to become a predetermined rate of expansion and contraction on and after the second round of image forming operation.

In the embodiment described above, an example has been shown for forming images two times on the same sheet. However, it may be arranged to output the cycle of the main scan synchronous signal corresponding to the cycle required for each round of image forming operation by previously setting the cycle of the main scan synchronous signal corresponding to the rate of expansion and contraction of the sheet in each round of image forming operation so that it may also be applied to the case when images are formed more than three times on the same sheet as in the case of double-sided and composite modes of operation.

It may be further arranged to cope with the case when the sheet is expanded by the fixing process by increasing the cycle of the main scan synchronous signal.

FIGS. 8 through 11 show a second embodiment of the present invention. In this embodiment, it is arranged to automatically detect an actual rate of expansion and contraction of a sheet used for an image forming process, and then to expand or contract an image to be formed on the sheet. The images which are formed on and after the second round of an image forming process can thus be expanded or contracted corresponding to an actual rate of expansion and contraction of the copy sheet in the previous round of image forming process, thereby solving the problem of slippage among each image when images are formed by repeating the transfer and fixing process a plural number of times under the composite and double-sided modes of operation.

Similar to the first embodiment of the present invention, this embodiment shows the case of a light printer which is provided with an LED exposure unit 30, and its description will now be made omitting repeated descriptions.

Figure 8:
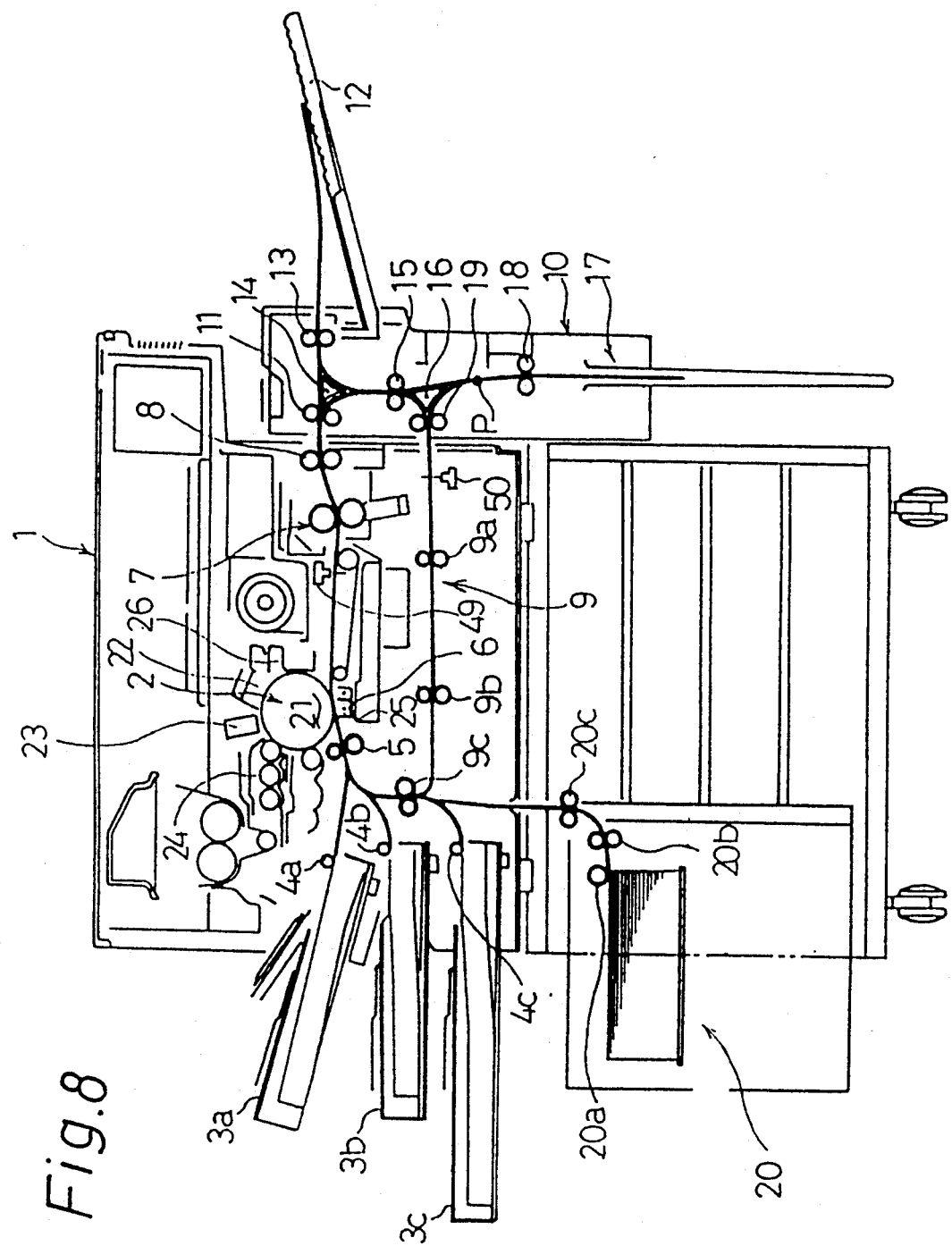
FIG. 8 is a schematic constructional view showing a printer of a similar type as that shown in the first embodiment which is applied to a second embodiment of the present invention.
Figure 9:
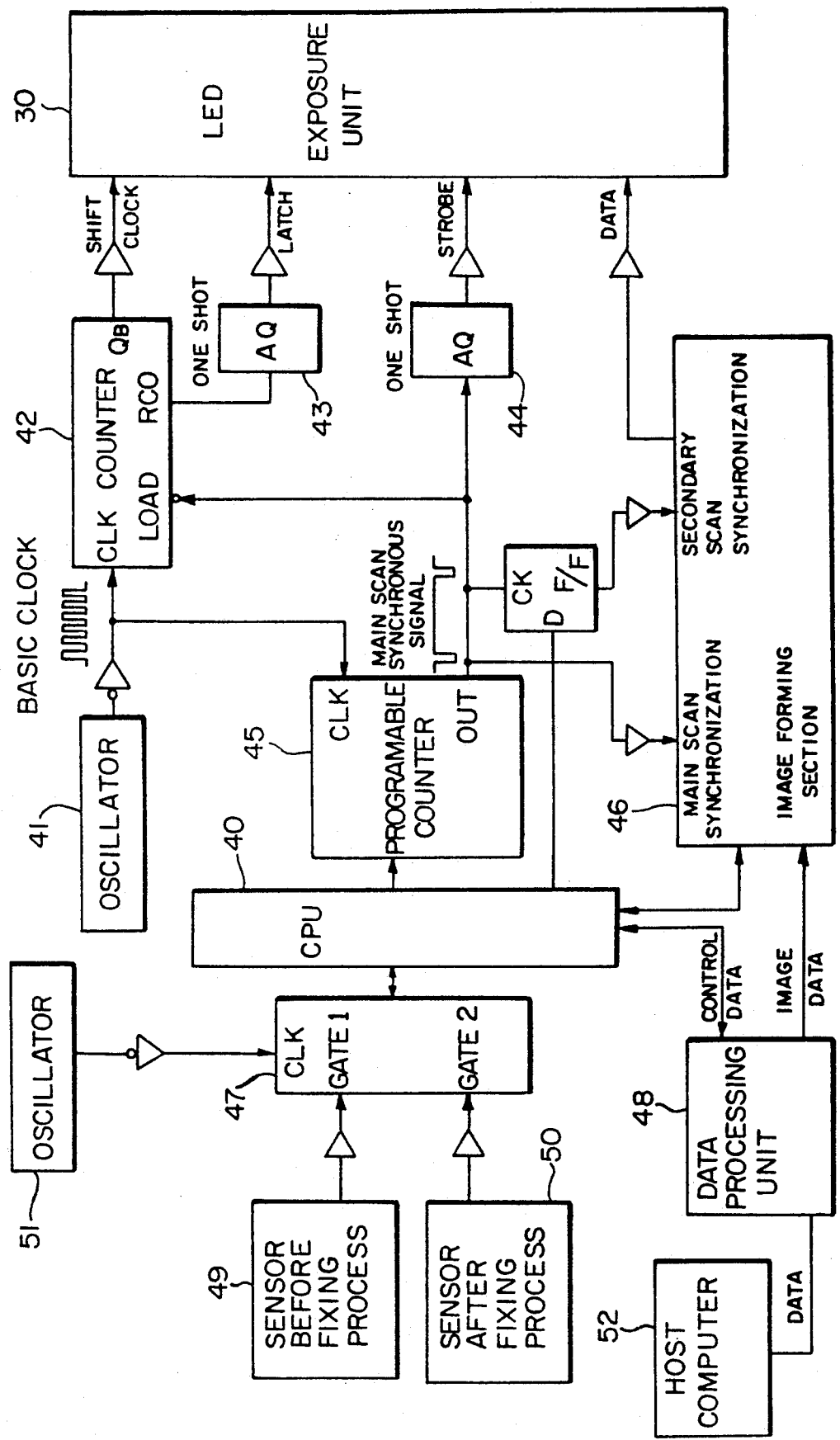
FIG. 9 is a control circuit diagram of an LED exposure unit.

As shown in FIG. 8, there are provided sensors 49 and 50 in front and in the rear of fixing section 7 on a paper feed path of the main body 1 of a printer and they are connected to a counter 47 in the operation control circuit illustrated in FIG. 9. In the operation control circuit of this embodiment, CPU 40 gives and receives signals to and from an image forming section 46 and a data processing unit 48. The data processing unit 48 receives data from host computer 52 and analyzes them wherein control data such as sheet size, double-sided mode, print mode and the like are outputted to the CPU 40, and image data is outputted to the image forming section 46 in compliance with instruction from the CPU 40.

The image forming section 46 performs a developing process of the image data to a bit map in accordance with the instruction from the CPU 40, and outputs image data successively to the LED exposure unit 30 in accordance with a main scan or secondary scan synchronous signal when the print operation is instructed. The counter 47 counts the number of clocks generated from an oscillator 51 which generates independent clocks while the sensors 49 and 50 arranged in front and in the rear of the fixing section detect the sheet being passed therethrough, and maintains the value counted to input the values into the CPU 40 at a predetermined time. The CPU 40 thus calculates the rate of expansion and contraction of the sheet caused by the fixing process basing on two of the calculated values inputted.

When printing is performed under a composite or double-sided mode, a programmable counter 45 is controlled by a control signal from the CPU 40, and the cycle of the main scan synchronous signal is expanded or contracted so as to expand or contract the length of the image in the secondary scanning direction corresponding to the rate of expansion and contraction of the sheet detected at the first round of the image forming process.

In this embodiment, description is made only for the case when a sheet is contracted by the fixing process like the first embodiment of the present invention.

Figure 10:
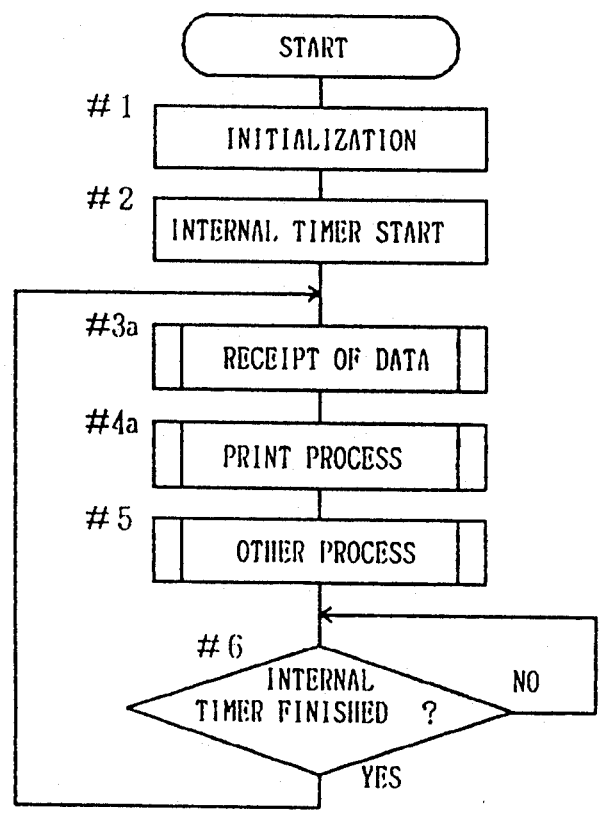
FIG. 10 is a main flow chart of control.

FIG. 10 shows the main routine of the CPU 40. When the power source of main body 1 is turned on and the program is started by resetting the CPU 40, steps #1 and 2 are executed in the same manner as the first embodiment of the present invention. At step #3a, control data such as sheet size, print mode for either double-sided or composite and the like are received from the data processing unit 48. Then, at step #4a, a subroutine of the print processing for this one embodiment is executed. At step #5, the program is executed in the same manner as the first embodiment, and at step #6, the program returns to step #2 when the internal timer is finished.

Figure 11:
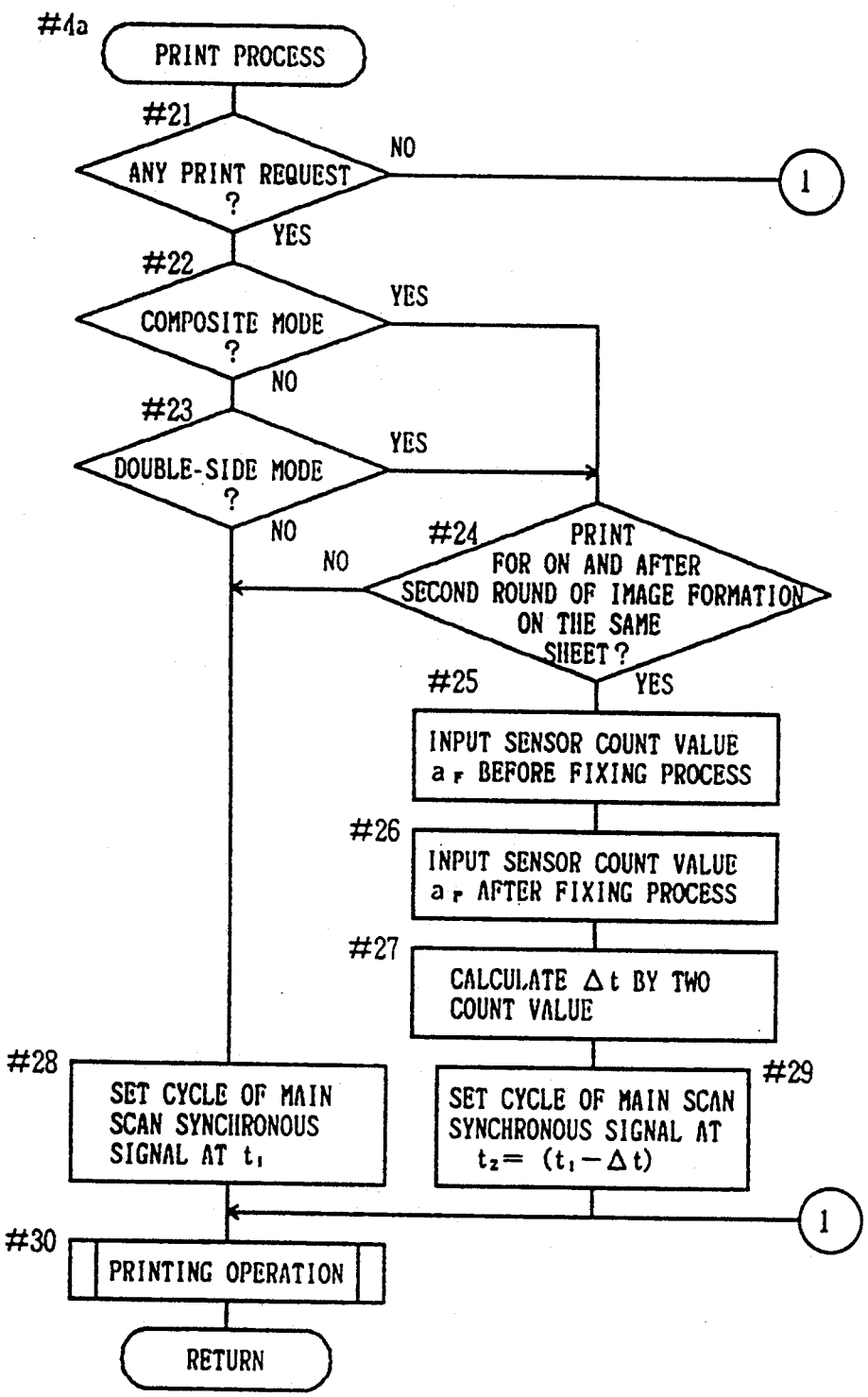
FIG. 11 is a flow chart of a subroutine of a printing process.

FIG. 11 is a flow chart showing the subroutine used in print processing at step #4a, wherein steps #22 through 29 are executed only once when a print operation is requested. The print request signal is emitted to the CPU 40 from the data processing unit 48 based on the data of the operational condition of the printer and the data from the host computer 52. By receiving the signal, the CPU 40 dispatches instructions to the image forming section 46 for starting a print operation by the subroutine of a print operation at step #30.

A print request signal for forming images on the same sheet on and after a second round of an image forming process under a double-sided or composite mode is emitted when the sheet which has finished a first round of image processing is passed through the sensor 50 after a fixing process.

A concrete description will now be made below. At step #21, judgment is made whether there was a print request signal or not, and if not, the program proceeds to the subroutine of print operation at step #30. If there was a print request signal, the program proceeds to step #22.

If a judgment is made for either a composite or double-sided mode at steps #22 or #23, and the count values $a_F$, $a_P$ detected by sensors 49, 50 before and after the fixing process are inputted to CPU 40 from the counter 47 at steps #24, 25 and 26, and the amount $\Delta_t$ required for rectifying the cycle of the main scan synchronous signal based on the rate of expansion and contraction of the sheet is obtained from the following equation:

$$\Delta_t = \frac{a_F - a_P}{a_F} \cdot t_1$$

at step #27 the count values $a_F$ and $a_P$ are processed to determine a difference in the length of the sheet. Then, at step #29, the cycle of the main scan synchronous signal is set at $t_2=(t_1-\Delta_t)$ to provide an exposure timing cycle. At step #30, instruction is given to the image forming section 46 and the programmable counter 45 to perform a print operation with the cycle of a synchronous signal as decided above the programmable counter 45 output enables a strobe signal to be generated.

In this embodiment, an example is also given for forming images two times on the same sheet. However, it can be applied to the case in which images are formed more than three times on the same sheet as in the case of the double-sided and composite modes of operation. Especially, the method of expanding or contracting an image formation based on the result of detection, in which an actual rate of expansion and contraction of the copy sheet caused by a fixing process is detected, may be applied to any system of an image forming process and image rectifying process already well known. It may also be applied to the case when a sheet is expanded, as in the case of the first embodiment of the present invention.

This embodiment may also be applied to an apparatus other than an LED printer, for instance, to laser beam printers, analogue copying machines and the like, or to an apparatus which is arranged to control expansion and contraction of the an image in the second round of image forming operation by a different method from this embodiment. If it is arranged to measure the rate of expansion and contraction of a sheet in the direction perpendicular to the sheet transport direction, it will be advantageous when expansion and contraction of an image in that direction needs to be particularly controlled.

A drum type photoconductor is adopted in each embodiment of the present invention. However the drum type is not limited. Any type of photoconductor such as a belt type or the like may be adopted. Not limited to the apparatus in which only a photoconductor is moved, it may also be arranged to coordinate the movement of print head and photoconductor in the secondary scanning direction.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus, comprising:
   a photoconductor;
   a linear print head for exposing the photoconductor so as to form a line image including a plurality of printing dots;
   a driving means for correlatively moving the photoconductor and the linear print head in a direction perpendicularly intersecting a longitudinal direction of the print head;
   an oscillator for generating a shift clock signal;
   a programmable counter for receiving the shift clock signal, for generating a main scan synchronization signal based on said shift clock signal, said main scan synchronization signal having a cycle rate, and for generating a secondary scan synchronization signal based on said shift signal, said secondary scan synchronization signal being set to a first value to signal an exposure of the photoconductor and a second value when the photoconductor is not being exposed; and
   a generating means for generating a strobe signal based on the main scan synchronization signal, while the secondary scan synchronization signal is set to said first value;
   an input means for inputting an image signal to said linear print head, said linear print head exposing the photoconductor according to the image signal in response to the generation of the strobe signal after one line of the image signal is inputted, said input means only being active while said secondary scan synchronization signal is set to said first value;

an image forming section for forming an image formed on the photoconductor onto a sheet;

wherein the programmable counter changes the main scan synchronization rate and the period during which the secondary scan synchronization is set to said first value to change the magnification of the image to be formed.

2. An improved image forming apparatus for providing multiple copying cycles of the same copy sheet, comprising:

a photoconductor;

means for applying an image to the photoconductor including a linear print head for exposing the photoconductor to a line image including a plurality of printing dots;

a driving means for correlatively moving the photoconductor and the linear print head;

an oscillator for generating a shift clock signal;

a programmable counter for receiving the shift clock signal and for generating a main scan synchronization signal based on said shift clock signal, said main scan synchronization signal having a cycle rate;

a generating means for generating a strobe signal based on the main scan synchronization signal;

an input means for inputting an image signal to said linear print head, said linear print head exposing the photoconductor according to the image signal in response to the generation of the strobe signal after one line of the image signal is inputted;

an image forming section for forming an image formed on the photoconductor onto a copy sheet;

a transporting means capable of transporting a copy sheet on which an image has been formed back to the image forming section for a subsequent round of an image forming process wherein the programmable counter changes the main scan synchronization signal based on a predetermined value prior to the subsequent round of the image forming process.

3. An image forming apparatus, comprising:

a photoconductor;

a linear print head for exposing the photoconductor so as to form a line image including a plurality of printing dots;

a driving means for correlatively moving the photoconductor and the linear print head in a direction perpendicularly intersecting a longitudinal direction of the linear print head;

a generating means for generating a strobe signal at a predetermined cycle;

an input means for inputting an image signal to said linear print head, said linear print head exposing the photoconductor according to the image signal in response to the generation of the strobe signal after one line of the image signal is inputted;

an image forming section for transferring the image formed on the photoconductor onto a sheet;

a fixing means for fixing the image on the sheet;

a transporting means for transporting the sheet on which an image has been formed during a first round of an image forming process back to the image forming section for a second round of an image forming process;

a first detector positioned along a path of said sheet before a fixing means, said first detector detecting the passage of a leading edge of said sheet and a trailing edge of said sheet and determining a first length of said sheet;

a second detector positioned along a path of said paper after the fixing means, said second detector detecting the passage of a leading edge of said sheet and a trailing edge of said sheet and determining a second length of said sheet;

processing means for comparing said first length and said second length to determine a difference in length of said sheet; and an exposure timing control means for setting a generating cycle of the strobe signal for the second round of an image forming process on a sheet based on said strobe signal of said first round and said difference in length of said sheet so as to vary from the generating cycle of a first round of the image forming process.

4. The image forming apparatus as defined in claim 3, wherein the linear print head is an LED array where a plurality of LEDs are linearly arranged, and the input means is a driving circuit for selectively causing the LED to emit light.

5. The image forming apparatus as defined in claim 3, wherein the transporting means includes a means for transporting a sheet on which an image has been formed in a first round of an image forming process to the image forming section again by reversing the sheet for forming images on both sides of the sheet, and a means for transporting a sheet on which an image has been formed at a first round of an image forming process to the image forming section again, without reversing the sheet, for forming a plurality of images on the same surface of the sheet.

6. The image forming apparatus of claim 3, wherein the input means comprises:

a shift register for successively receiving one line of image data from an image source, each line being received at a rate determined by a shift clock signal;

a latch register for latching image data of the shift register based on a latch signal;

an LED driver for driving the linear print head by transferring data from the latch register to an LED array at a rate determined by the strobe signal.

7. The image forming apparatus of claim 3, wherein the generating means further comprises an oscillator for generating a shift clock signal;

a programmable counter for receiving the shift clock signal, generating a main scan synchronization signal based on said shift clock signal, said main scan synchronization signal having a cycle rate, and for generating a secondary scan synchronization signal based on said shift signal, said secondary scan synchronization signal being set to a first value to signal the exposure of the sheet and a second value at other times; and a strobe signal generating means for generating a strobe signal based on the main scan synchronization signal while the secondary scan synchronization signal is set to said first value.

8. The image forming apparatus of claim 7, wherein a main scan synchronous signal is output at a cycle rate of $t_2=(t_1-\Delta t)$, where $t_1$ is an initial period of the main scan synchronization signal cycle and wherein $\Delta t$ is a difference in scan time determined in accordance with a difference in length of the sheet detected by the first detector and the second detector.

9. The image forming apparatus of claim 7, wherein said first detector includes means for counting a first number of cycles of said clock signal occurring between detection of said leading edge and said trailing edge of said sheet by said first detector;

wherein said second detector includes means for counting a second number of cycles of said clock signal occurring between detection of said leading edge and said trailing edge of said sheet by said second detector; and wherein said main scan synchronization scan difference Δt is determined by:

$$\Delta_t = \frac{a_F - a_P}{a_F} \cdot t_1$$

wherein $a_F$ is the number of counts determined by the first sensor, $a_P$ is the number of counts determined by the second sensor, and $t_1$ is an original main scan synchronization time period.

10. An image forming apparatus, comprising:
a photoconductor;
a linear print head for exposing the photoconductor so as to form a line image including a plurality of printing dots;
a driving means for correlatively moving the photoconductor and the linear print head in a direction perpendicularly intersecting a longitudinal direction of the linear print head;
a strobe signal generating means for generating a strobe signal;
an input means for inputting an image signal to said linear print head, said linear print head exposing the photoconductor according to the image signal in response to the generation of the strobe signal after one line of the image signal is inputted;
an image forming section for forming an image on the photoconductor onto a sheet;
a transporting means capable of properly transporting a sheet, on which an image has been formed in the image forming section, to enable a subsequent second round of an image forming process on the sheet;
a first detecting means for detecting a length of a sheet in the transporting direction before a first round of an image forming process on the sheet is finished;
a second detecting means for detecting the length of a sheet in the transporting direction after a first round of an image forming process on the sheet has been finished;
a processing means for deciding a value in accordance with the lengths of the sheet detected by said first and second detecting means;
a clock signal generating means for generating a clock signal with a predetermined frequency; and
a counting means for counting the number of the clock signals which have been generated by the clock signal generating means since the generation of the last strobe signal;
said strobe signal generating means generating the strobe signal at a predetermined cycle on the first round of an image forming process and at a cycle based on comparison between the value decided by said processing means and the number counted by said counting means on the second round of an image forming process.

11. The image forming apparatus as defined in claim 10, wherein the linear print head is an LED array with a plurality of LEDs linearly arranged, and the input means includes a driving circuit for selectively causing the LED array to emit light.

12. The image forming apparatus as defined in claim 10, wherein the transporting means includes a means for transporting a sheet on which an image has been formed in a first round of an image forming process to the image forming section again by reversing the sheet for forming images on both sides of the sheet, and a means for transporting a sheet on which an image has been formed at a first round of an image forming process to the image forming section again, without reversing the sheet, for forming a plurality of images on the same surface of the sheet.

13. The image forming apparatus as defined in claim 10, wherein the image forming section includes a means for transferring a toner image formed on the photoconductor onto a sheet and a means for fixing the toner image transferred onto the sheet, and the first detecting means detects the length of the sheet before it reaches the fixing means, and the second detecting means detects the length of the sheet after it has passed through the fixing means.

14. The image forming apparatus as defined in claim 13, wherein the fixing means is arranged for fixing the toner image on a sheet by heating, and the cycle of exposure at the second round of an image forming process onto the sheet is shorter than that of the first round of an image forming process.

* * * * *